United States Patent [19]
Cowsar et al.

[11] Patent Number: 6,042,464
[45] Date of Patent: Mar. 28, 2000

[54] METHOD AND APPARATUS FOR THE EXTRACTION OF EDIBLE PRODUCTS FROM CRAWFISH AND SIMILAR CRUSTACEANS

[76] Inventors: Thomas C. Cowsar, 26890 Pine View Dr., Walker, La. 70785; Margaret Cowsar Waid, 3103 Hollow Creek Ct., Houston, Tex. 77082

[21] Appl. No.: 09/139,947

[22] Filed: Aug. 25, 1998

[51] Int. Cl.⁷ .................................................. A22C 29/02
[52] U.S. Cl. ..................................................... 452/8; 452/5
[58] Field of Search ........................................ 452/8, 4, 5

[56] References Cited

U.S. PATENT DOCUMENTS

| | | |
|---|---|---|
| 3,110,926 | 11/1963 | Martin . |
| 3,221,363 | 12/1965 | Couret . |
| 3,278,983 | 10/1966 | Martin . |
| 3,758,921 | 9/1973 | Ingalls . |
| 3,789,460 | 2/1974 | Ingalls . |
| 4,196,495 | 4/1980 | Mestayer et al. . |
| 4,385,422 | 5/1983 | Ingalls et al. . |
| 4,524,490 | 6/1985 | Newville . |
| 4,531,261 | 7/1985 | Sanaka ........................................ 452/1 |
| 4,912,810 | 4/1990 | Laughlin et al. ........................... 452/8 |
| 4,928,352 | 5/1990 | Thibodeaux . |
| 5,055,085 | 10/1991 | Thibodeaux . |

*Primary Examiner*—Willis Little
*Attorney, Agent, or Firm*—Gilbreth & Associates P.C.; J. M.(Mark) Gilbreth

[57] ABSTRACT

The present invention provides an automated apparatus and method for extracting substantially all the tail meat from the crawfish exoskeleton, while consistently removing the intestinal tract, and without damage to the meat. In addition, the apparatus is capable of processing crawfish of all sizes and shell hardness at a rate greater than that of hand peeling.

8 Claims, 5 Drawing Sheets

METHOD AND APPARATUS FOR THE EXTRACTION OF EDIBLE PRODUCTS FROM CRAWFISH AND SIMILAR CRUSTACEANS

BACKGROUND OF THE INVENTION

1. Field of the Invention

The present invention relates to an apparatus and method for the processing of food. In another aspect, the present invention relates to an apparatus and method for the extraction of edible products from crawfish and other crustaceans. In even another aspect, the present invention relates to a labor saving apparatus and method that consistently removes the intestinal track from whole crawfish while neither wasting nor damaging the tail meat.

2. Description of the Related Art

The Wall Street Journal, May 7, 1996, documents the "epic quest" in which tinkerers have been laboring in South Louisiana garages, machine shops and seafood houses for more than 20 years pursuing the elusive goal of inventing a contraption that will separate the small but well armored crawfish from their tender tail meat. The Wall Street Journal further notes that with the industry's future now hanging in the balance, the "quest" has taken on an almost epic proportions in Louisiana, where most of the nation's crawfish are harvested and eaten.

The story of the development of a crawfish peeling machine is one of long felt need coupled with numerous failures by others.

Crawfish and similar crustaceans are becoming an increasingly popular food in the United States and abroad. Typically, in the Texas Gulf Coast area, larger crawfish are boiled in spices then individually peeled and eaten by the diner.

The normal method of eating a crawfish, requires that the crawfish meat be removed from the shell, and involves breaking the crawfish, and removing the head piece which contains little edible matter, straightening the shell with the fingers, removing the two rigns closest to the head and attempting to squeeze the shell, much in the manner of squeezing a tube of tooth paste from the bottom.

However, not all crawfish are peeled and eaten by the diner. For example, peeled crawfish tails are required for use in such dishes as crawfish bisque, crawfish etouffe, fried crawfish tails and the like. However, there are several problems currently associated with the commercial preparation of peeled crawfish tails.

High labor costs, for example, make commercially processed peeled and packaged crawfish tails expensive. Peeling crawfish by hand is very labor intensive and time consuming. While a crawfish appears to resemble a lobster, it is a much different animal, being many, many times smaller. Thus, the hand peeling method typically associated with lobsters becomes very time consuming and labor intensive when applied to crawfish because the yield is so small for the time invested. For example, an experienced worker can peel and de-vein a crawfish tail in about three seconds, but the work is tough and tedious. This is especially true in the colder months when the shells of crawfish are hardest. To compound the problem of high domestic labor costs, there has been an influx of lower priced imported peeled crawfish tail meat.

Producers of crawfish in the United States, are and for some time have been searching for a labor saving machine that is able to peel crawfish tails. However, the problems associated with such devices involve the removal of the intestinal tract of the crustacean while leaving the tail meat intact.

A viable labor saving crawfish peeler therefore must be able to consistently remove the intestinal track, sometimes called the "sand" or "mud" vein, while neither wasting nor mangling the delicate tail meat. Such a device must be able to efficiently and effectively uncurl the tail of cooked crawfish, remove the head, and be able to accommodate crawfish of all sizes and shell hardnesses.

There have been numerous attempts in the prior art to automate crawfish peeling.

U.S. Pat. No. 3,110,926, issued Nov. 19, 1963 to Martin discloses an apparatus and process for the treatment of crustacea such as crawfish, prawns and the like, to clean out the contents of the black vein, or sand sac, form the tail portions and render it ready for marketing as processed products for human consumption. The contents of the vein are flushed or sluiced out by fluid pressure introduced into one end of the tail. The '926 device, however, does not remove the crawfish head and requires two steps to extract the tail meat from the exoskeleton, one to remove the vein contents, the other to remove the tail meat.

U.S. Pat. No. 3,221,363, issued Dec. 7, 1965 to Couret discloses a process for removing the edible meats from crustacea tails, and has for an object to provide a method for removing the edible meat from the Dublin Bay prawn, which is commercially known as scampi. The meat is de-veined while the meat is still in the prawn shell by boring adjacent to the vein to sever the vein from contact with the shell and applying negative pressure to the hollow bore of the boring instrument to draw off the severed vein from the meat. Fluid pressure then ejects the meat from the shell. The '363 device, however, does not remove the crawfish head and requires two steps to de-vein the tail meat, one to sever the mud vein and the second to remove the vein by vacuum pressure. Severing the vein increases the likelihood of spilling its contents and/or leaving portions of the vein attached to the meat.

U.S. Pat. No. 3,278,983, issued Oct. 18, 1966to Martin discloses an improved process for the removal, or flushing out, of the black vein and for removing the flesh in on one piece from the severed tail portions of crustacea. The crustacean are fed tail first to a water nozzle applied to the anus for the flushing out of the sand sac and then to an air nozzle inserted into the tail for ejection of the flesh from the shell. This '983 device is a refinement of the '926 device and suffers from the same drawbacks.

U.S. Pat. No. 3,758,921, issued Sep. 18, 1973 to Ingalls discloses a machine for automatically peeling crawfish or other crustaceans in which the crustacean to be peeled has its head and tail respectively held between grippers on separate conveyors having operative runs which diverge in the direction of their movement. The grippers of the two conveyers are in laterally opposed pairs which are located abreast of and adjacent to each other at the loading ends of the conveyers to receive the head and tail sections respectively of the crustacean and thereafter to separate the head and tail sections as they move apart due to the divergences of the operative conveyer runs, with the meat remaining in the tail section. The meat retained in the tail section is ejected by shearing off the extremity of the tail section incident to movement of its associated conveyer, then injecting a blast of pressurized air into the tail section through the opening formed by such shearing operation. The '921 device simply blows the tail meat through a tunnel created by removing the head and severing the tail. The '921 device makes no reference to the consistent removal of the sand vein.

U.S. Pat. No. 3,789,460, issued Feb. 5, 1974 to Ingalls discloses pairs of grippers for operative engagement with the tail and head ends respectively of a crawfish where the grippers are supported for movement in synchronized relation through separate but tangentially related orbits wherein both pairs of grippers simultaneously move in a common direction through or past the point of tangency of their respective orbits. Thus a crawfish, the tail of which is placed in the tail grippers with its head projecting therefrom, will be carried toward the point of tangency to place its head in the head grippers, which will then be closed approximately at the point of tangency to then remove the head during continued movement of both pairs of grippers through and past the point of tangency, leaving the meat within the portion retained in the tail grippers. A nozzle which penetrates the tail section of the shell, then injects a blast of air into the shell to eject the meat. The deveining pin on which the shell and meat are impaled when initially placed in the tail grippers, functions to open and remove the sand vein from the crawfish incident to its ejection under the influence of the air blast. The '460 device does remove the crawfish head but requires the tail to be manually straightened. The '460 device attempts to remove the sand vein by means of a pin which splits the meat and sometimes destroys the integrity of the vein spilling its contents. In addition, the '460 device requires hand separation of the meat from the vein.

U.S. Pat. No. 4,196,495 issued Apr. 8, 1980 to Mestayer et al. discloses an apparatus for separating edible tail portions of crawfish and similar crustaceans from exoskeletal portions thereof, the '495 invention comprises a first roller having a concave lateral peripheral edge surface which is opposed at a substantially constant spacing by a convex lateral peripheral edge surface of a second roller, the rollers being rotated in opposite senses to receive the exoskeletal portions of the crawfish between the opposing peripheral edge surfaces of the rollers. Rear margins of the flippers of the crawfish are grasped between the counter rotating rollers, the exoskeletal portions covering the tail being pulled between the rollers to peel said exoskeletal portions from the edible portions and to simultaneously deveining the crawfish tail. The '495 device removes neither the crawfish head nor the sand vein. In addition, the '495 device does not work on cooked crawfish.

U.S. Pat. No. 4,385,422, issued May 31, 1983 to Ingalls, deceased et al. discloses an improved apparatus for deheading and peeling crawfish comprising pairs of gripper assemblies for operative engagement with the head and tail sections of a crawfish, respectively, supported for movement in synchronized relation through separate but tangentially related orbits wherein the pairs of grippers simultaneously move in a common direction through or past the point of tangency of their respective orbits wherein the tail holding gripper assemblies each comprise a lower crawfish pan constructed from flexible rubber or plastic having an arcuate cross section greater than 180° and a top arm pivotly mounted above the lower pan to hold the crawfish in the pan during the deheading cycle the pivoting of the top arm being actuated by a simplified cam assembly. The, '422 device does not provide any means for removing the sand vein, nor adequately allows for different sizes of crawfish.

U.S. Pat. No. 4,928,352, issued May 29, 1990 to Thibodeaux discloses a crawfish peeling apparatus for separating the crawfish upper and lower tail exoskeleton portions from the soft inner meat product including a frame that supports a feed mechanism for advancing crawfish tails to be peeled along a travel path that traverses a cutter. The cutter includes preferably a pair of spaced apart rotary blades, each pair overlapping in a scissoring fashion so that longitudinal edge cuts can be made along the left and right sides of the crawfish tail and extending substantially the full length of the crawfish tail. The '352 device does not remove the crawfish head and works only on raw crawfish.

U.S. Pat. No. 5,055,085 issued Oct. 8, 1991 to Thibodeaux discloses a crawfish peeling apparatus uses fluid under pressure flowing through a tool body to a lance that punctures the crawfish exoskeleton. Fluid exits the tool body at the lance and travels into the crawfish exoskeleton at the lance and forces the tail meat from the exoskeleton tail portion. The '085 device is not automated, does not remove the head and does not remove the vein.

Despite the advances of the prior art, there still does not exist a crawfish peeling apparatus which is able to uncurl the cooked crawfish tails of all sizes, snap such crawfish tails off the body, and then extract the delicate meat inside and pull out the tiny intestinal tract. For example, none of the above patents to Thibodeaux are capable of separating the intestinal vein from the tail meat. In fact, in the May 7, 1996 Wall Street Journal Article, Mr. Thibodeaux notes, "if it weren't for that vein, I'd be rich." In further testament to the difficult nature of devising a crawfish peeling apparatus which will remove the intestinal vein from the tail meat, the Wall Street Journal further notes that Mr. Thibodeaux has spent 10 years and nearly $50,000.00 searching for a viable peeler.

This same Wall Street Journal article further notes that a machine based on the Ingalls, several of which are referenced above, have also commercially failed.

Therefore there is a need in the art for a crawfish peeling apparatus and method that does not suffer from the deficiencies of the prior art.

There is another need in the art for a crawfish peeling apparatus and method that is more efficient, but just as effective as hand peeling.

There is even another need in the art for a crawfish peeling apparatus and method that is able to consistently remove the intestinal track, while neither wasting nor mangling the tail meat.

There is yet another need in the art for a crawfish peeling apparatus and method that is able to accommodate crawfish of all sizes and shell hardnesses.

SUMMARY OF THE INVENTION

It is an object of the present invention to provide a crawfish peeling apparatus and method that does not suffer from the deficiencies of the prior art.

It is another object of the present invention to provide for a crawfish peeling apparatus and method that is able to consistently remove the intestinal track, or "mud" vein, while neither wasting nor mangling the tail meat.

It is even another object of the present invention to provide for a crawfish peeling apparatus and method that is more efficient than hand peeling.

It is yet another object of the present invention to provide for a crawfish peeling apparatus and method that is able to accommodate crawfish of all sizes and shell hardnesses.

These and other objects of the present invention will become apparent to those of skill in the art upon review of this patent specification, claims and drawings.

According to one embodiment of the present invention there is provided an apparatus for processing a crustacean shell having tail meat and an intestinal tract where the devise includes a crustacean clamping device located above a clamping area, a hollow shell piercing tubular projection located in the clamping area and having an end suitable for piercing the shell, and a fluid reservoir in fluid communication with the hollow shell piercing tubular projection. The clamping device causes the hollow shell piercing tubular projection to puncture the shell of the crustacean. A blast of fluid from the fluid reservoir into the hollow shell piercing tubular projection removes the tail meat from the shell and intestinal track.

According to another embodiment of the present invention there is provided a method for processing a crustacean shell having tail meat and an intestinal tract comprising. The method includes puncturing the crustacean shell with a hollow shell piercing tubular projection and then providing a fluid through the hollow shell piercing tubular projection into the shell sufficient to eject the tail meat from the shell and intestinal tract.

These and other embodiments of the present invention will become apparent to those of skill in the art upon review of this patent specification, claims and drawings.

DETAILED DESCRIPTION OF THE INVENTION

The present invention provides an automated apparatus and method for extracting substantially all the tail meat from the crawfish exoskeleton, while removing substantially all of the intestinal tract, and without causing undue damage to the meat. In addition, the apparatus is capable of processing crawfish of all sizes and shell hardness at a rate greater than that of hand peeling.

Figure 1:
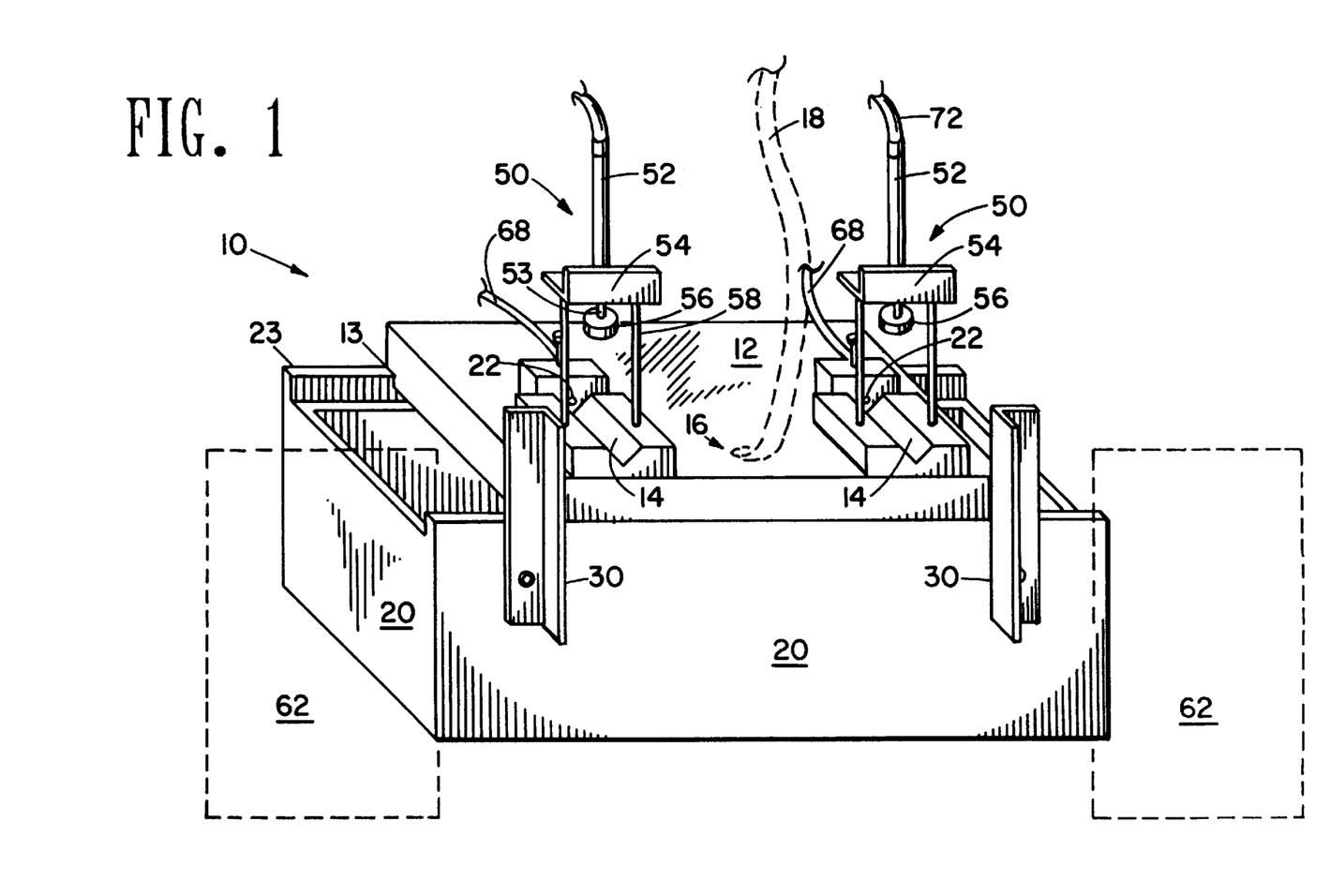
FIGS. 1, 2 and 3 are various views of the crawfish peeling apparatus 10 including housing 20, de-heading devices 30 and clamping devices shown generally at 50, with motor driven reciprocating bed 12 located in the middle position, the far left position, and the far right position, respectively.
Figure 2:
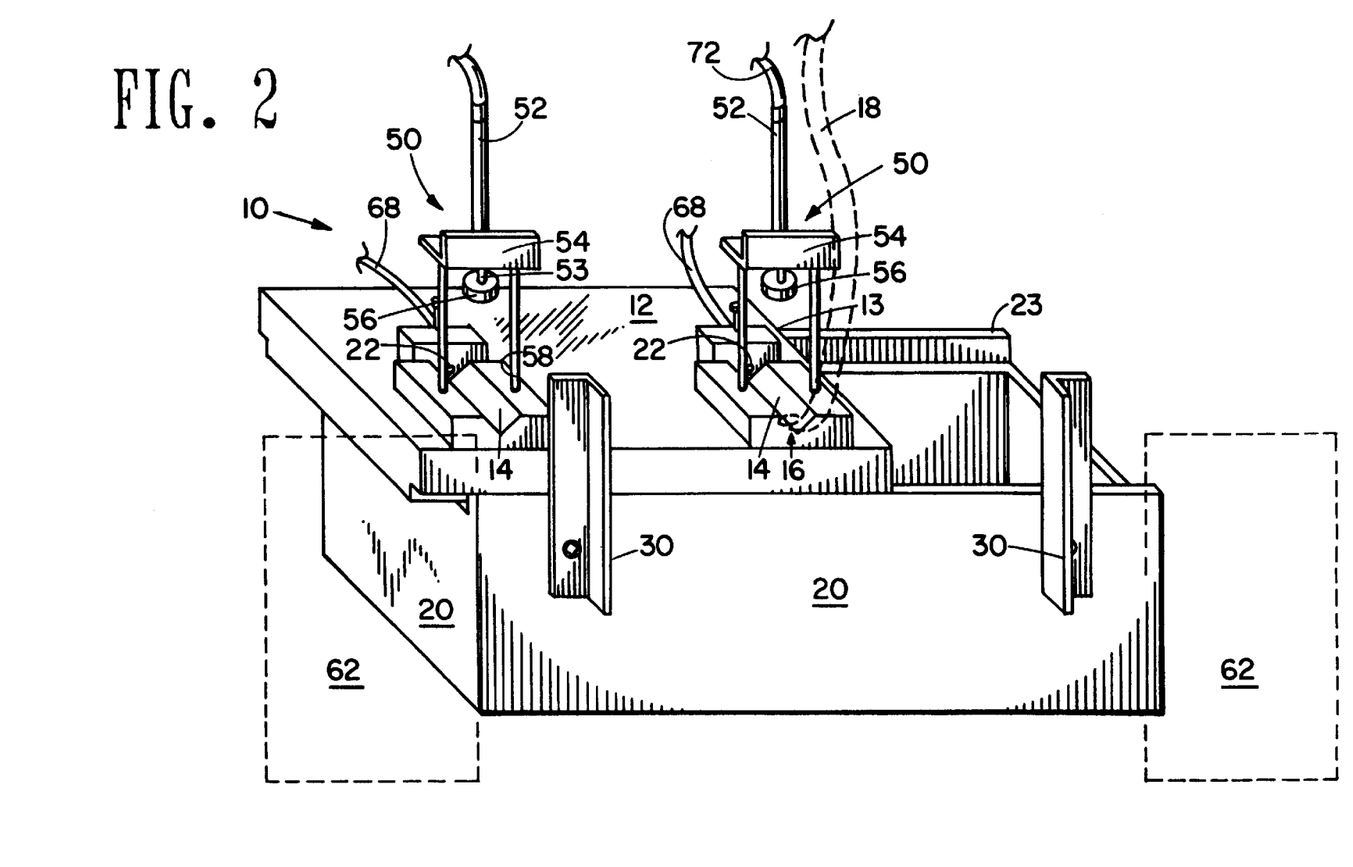
Figure 3:
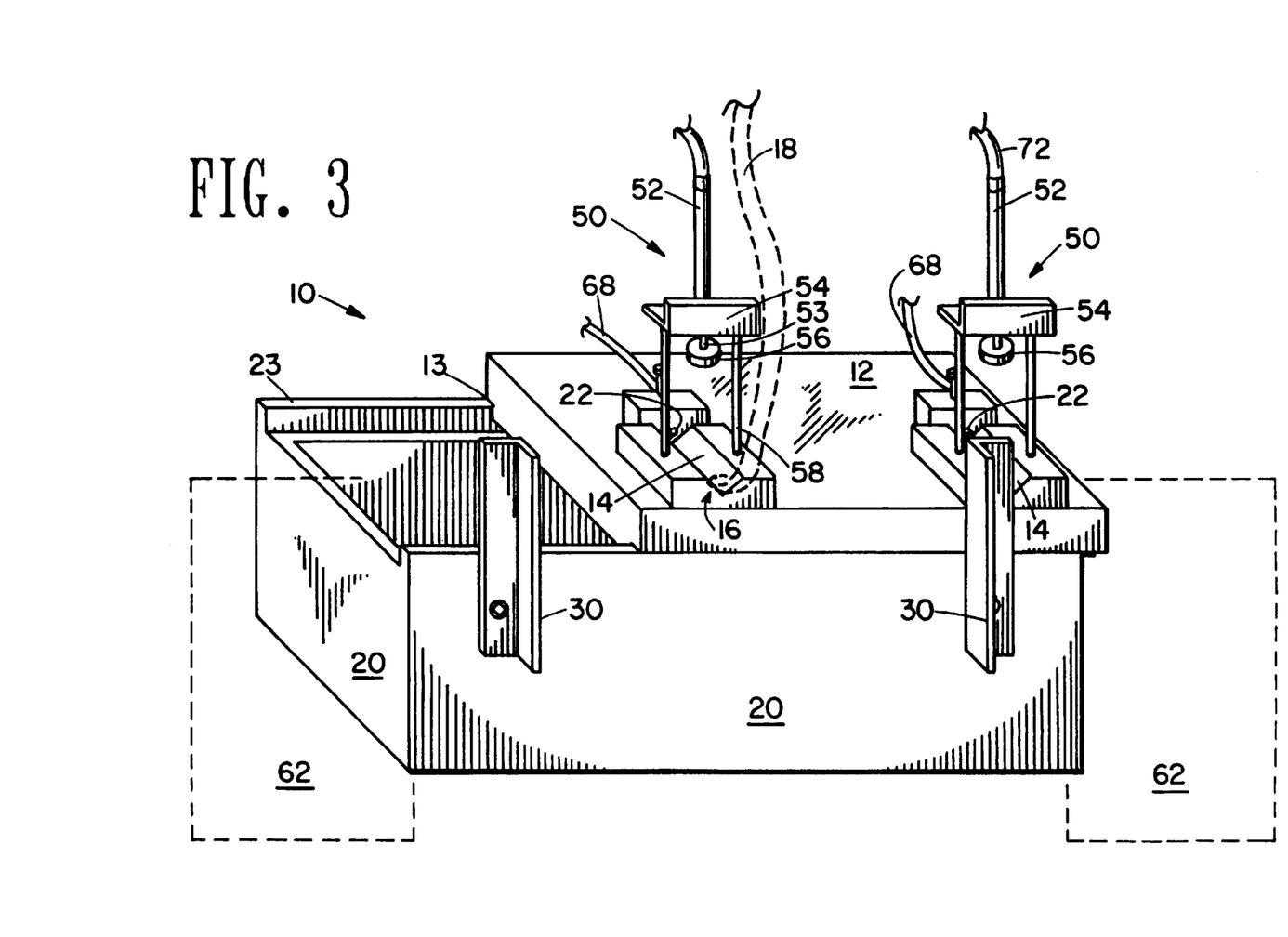

Referring now to FIGS. 1–3 there is shown one embodiment of the crawfish peeling apparatus 10 of the present invention. In the embodiment shown, the apparatus 10 includes housing 20 with bins 62 for receiving peeled and de-veined crawfish tails. Bins 62 may be mounted on or positioned near housing 20 suitable to receive the peeled and de-veined crawfish tails. Alternatively the peeled tails may be ejected or otherwise placed on a conveyor belt or other suitable means for transportation to areas for further processing such as washing, sorting or grading, seasoning, pasteurizing, and/or packaging. Housing 20 supports motor driven reciprocating bed 12. Housing 20, reciprocating bed 12, and bins 62 each may be made of any material suitable for food processing. Examples of suitable materials include stainless steel, aluminum, acrylics, polyesters, polyethylene or other food grade plastics, or other materials with a food grade coating. Preferably, housing 20 reciprocating bed 12, and bins 62 are made of food grade plastic.

Reciprocating bed 12 further includes grooves 13 for receiving tract 23 of housing 20. Reciprocating bed 12 traverses along housing 20 on tract 23.

Reciprocating bed 12 is driven by any suitable means. Preferably, reciprocating bed 12 is driven by an electrical motor (not shown). The motor may be an AC gear motor or DC variable speed motor. In the practice of the present invention reciprocating bed 12 is generally operated at any suitable speed for the rate of production desired. While not wishing to be limited to any particular reciprocating rate, it is noted that in the embodiment shown in the figures, the motor preferably operates reciprocating bed 12 at a speed of between about 0 to about 60 rpms, more preferably at a speed of between about 15 to about 45 rpms and most preferably at speed of between about 30 to about 35 rpms. The motor may be located within housing 20, adjacent to the peeling apparatus 10, or otherwise placed in a central location. The motor may drive a single peeling unit or alternatively be adapted to control several peeling units.

The rate at which reciprocating bed 12 moves can be increased or decreased depending on, for example, the skill level of a particular worker using the apparatus or for a particular type of automatic loading.

One or more clamping areas 14, for receiving a crawfish or similar crustacean, are located on reciprocating bed 12. While the embodiment in the figures show two clamping areas 14, it is understood that the present invention could include a single clamping area 14 or any desired number of clamping areas 14. Clamping areas 14 are shown in the Figures to be V-shaped. However, clamping area 14 may be of any suitable shape or size to receive a crawfish or similar crustacean. As non-limiting examples, each clamping area 14 may be a tubular, squared, U-shaped or V-shaped trough or channel. In addition, clamping areas 14 may be affixed to bed 12, as shown in the figures, or recessed into bed 12. The clamping areas 14 may be made of any suitable material. Non limiting examples include stainless steel, aluminum, acrylics, polyesters, polyethylene or other food grade plastics, or other materials with a food grade coating. Preferably, the clamping areas 14 are made of food grade plastic.

Positioned between clamping areas 14 on reciprocating bed 12 is loading area 16. While the embodiment in the figures show one loading area 16, it is understood that the present invention could include any number of loading areas 16. Loading area 16 is of a size suitable for a worker to place a crawfish or similar crustacean back down and tail away. Air hose 18 is conveniently positioned and designed to direct high velocity air flow onto the tail fin of a crawfish or similar crustacean so placed onto loading area 16.

A clamping device, shown generally as 50, is positioned convenient to each clamping area 14. Clamping devices 50 each contain a piston 52 where piston shaft 53 travels through piston housing 54 and terminates in clamping foot 56. Piston housing 54 is connected to housing 20 by supports 58. Preferably, piston shaft 53 is cylindrical and smooth. Preferably, pistons 52 are pneumatically operated. The pneumatic pumps are conveniently located and designed to operate one or more peeling apparatus of the present invention.

Clamping foot 56 may be of any size or shape suitable to clamp the tail of the crawfish or similar crustacean between foot 56 and onto tubular projection 22. As non-limiting examples, foot 56 may round, square, oval, triangular or hexagonal. Preferably, foot 56 is round.

Hollow tubular projection 22 is located within the back of clamping areas 14. Projection 22 extends into clamping area 14 and is designed to puncture the outer shell only of a crawfish or similar crustacean when foot 56 depresses the tail onto the projection 22. Hollow tubular projection 22 may be made of any material suitable and sufficiently rigid to puncture the shell of the crawfish such as plastic or stainless steel. Preferably, hollow tubular projection 22 is made of stainless steel tubing.

De-heading devices 30 are rigid structures extending from and affixed to housing 20. De-heading devices 30 may be made of the same material as housing 20 such as stainless steel, aluminum, acrylics, polyesters, polyethylene or other food grade plastics, or other materials with a food grade coating. Preferably, deheading devices 30 are made of a food grade plastic.

In the operation of the present invention, a boiled or blanched crawfish is placed either by hand or by a mechanical loader back down and tail away from the worker into loading area 16 while reciprocating bed 12 is moving to the center position as shown in FIG. 1. High velocity air, continuously delivered from air hose 18, uncurls the tail by directing the air against the back fin of the crustacean. Once the tail is uncurled, reciprocating bed 12 moves (either left or right) to place one clamping device 50 in position to allow for loading of the crawfish. The crawfish is placed back down and tail away from the worker into one clamping area 14.

Figure 4:
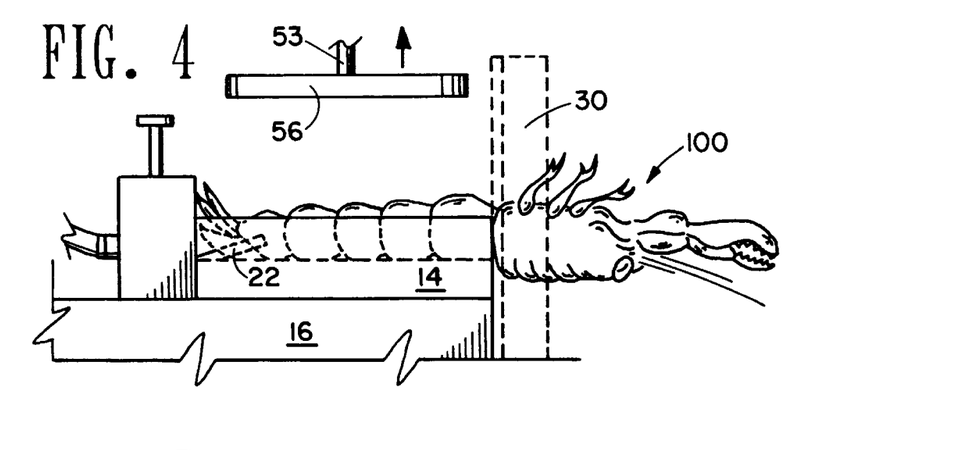
FIGS. 4, 5 and 6 are side views of clamping area 14 showing respectively, clamping foot 56 above crawfish 100, clamping area 14 with clamping foot 56 holding crawfish 100 as reciprocating bed 12 passes de-heading device 30, and reciprocating bed 12 in the farthest position from center where fluid pressure from tubular projection 22 ejects the tail meat from the crawfish shell.
Figure 5:
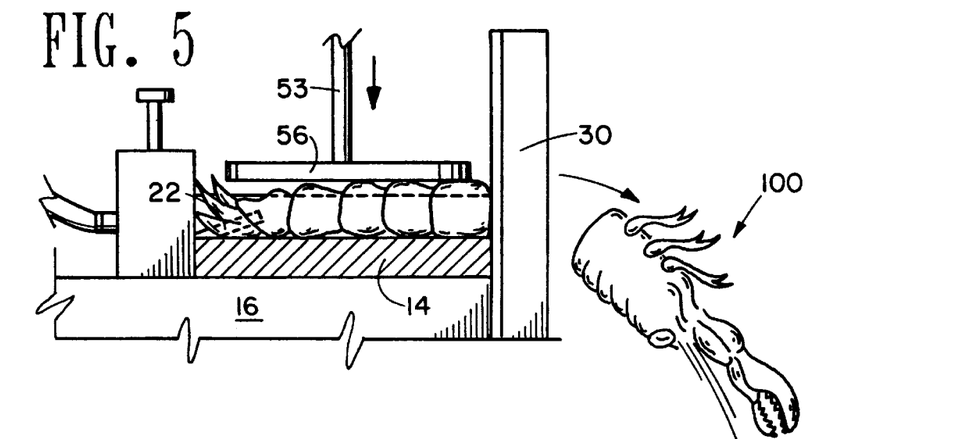
Figure 6:
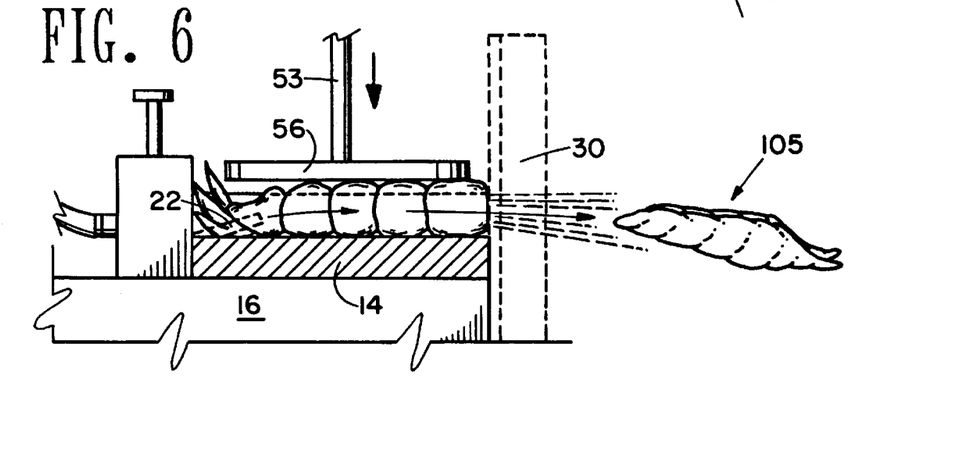

Referring now additionally to FIGS. 4–6, piston 52 then moves downward causing clamping foot 56 to contact the crawfish tail. Clamping foot 56 adaptively holds the crawfish tail flat and causes hollow tubular projection 22 to puncture only the outer shell of the crustacean in approximately the second ring of the tail from the fin. Hollow tubular projection 22 does not puncture through the entire tail rather it pierces the outer shell only leaving the sand or mud vein intact.

With the crawfish tail clamped between clamping foot 56 and hollow tubular projection 22, the crawfish head and claws extend past clamping area 14. As illustrated in FIG. 5, reciprocating bed 12 reverses direction (either left or right) moving past fixed de-heading device 30 which is attached to housing 20. The cephalothorax and claws of the crawfish are bent, pulled then separated from the tail section as reciprocating bed 12 moves the crawfish past de-heading device 30. The cephalothorax and claws may be collected for further processing or discarded.

While reciprocating bed 12 is moving to its furthest position either left or right from loading area 16, and after the cephalothorax and claws have been removed, a blast of fluid, preferably oil free compressed air delivered by hose 68, is forced through hollow tubular projection 22 which is embedded into the crawfish tail. The oil free compressed air is delivered via tubing 72 preferably at a pressure of between about 25 to about 80 psi. More preferably, the air is delivered between about 40 to about 45 psi. As illustrated in FIG. 6, the blast of fluid forces the tail meat 105 from the shell leaving the empty shell with the sand vein. The tail meat 105 is then ejected from the shell into collection bin 62 as shown in the figures or for example, onto a conveyor belt, into a chute, or otherwise collected for further processing. On the return of reciprocating bed 12, piston 52 moves up-ward raising clamping foot 56. The empty shell containing the sand vein is blown away by the high velocity air delivered from hose 18 to a collection area such as a bin or chute located in a suitable position to receive the empty shell. Loading area 16 is now ready to receive the next crawfish.

Reciprocating bed 12 obviates the need for a worker to move between the clamping areas 14, as clamping areas 14 and loading area 16 are being continuously moved to the worker by means of the reciprocating bed 12. The worker remains in the same center position as loading area 16.

Figure 7:
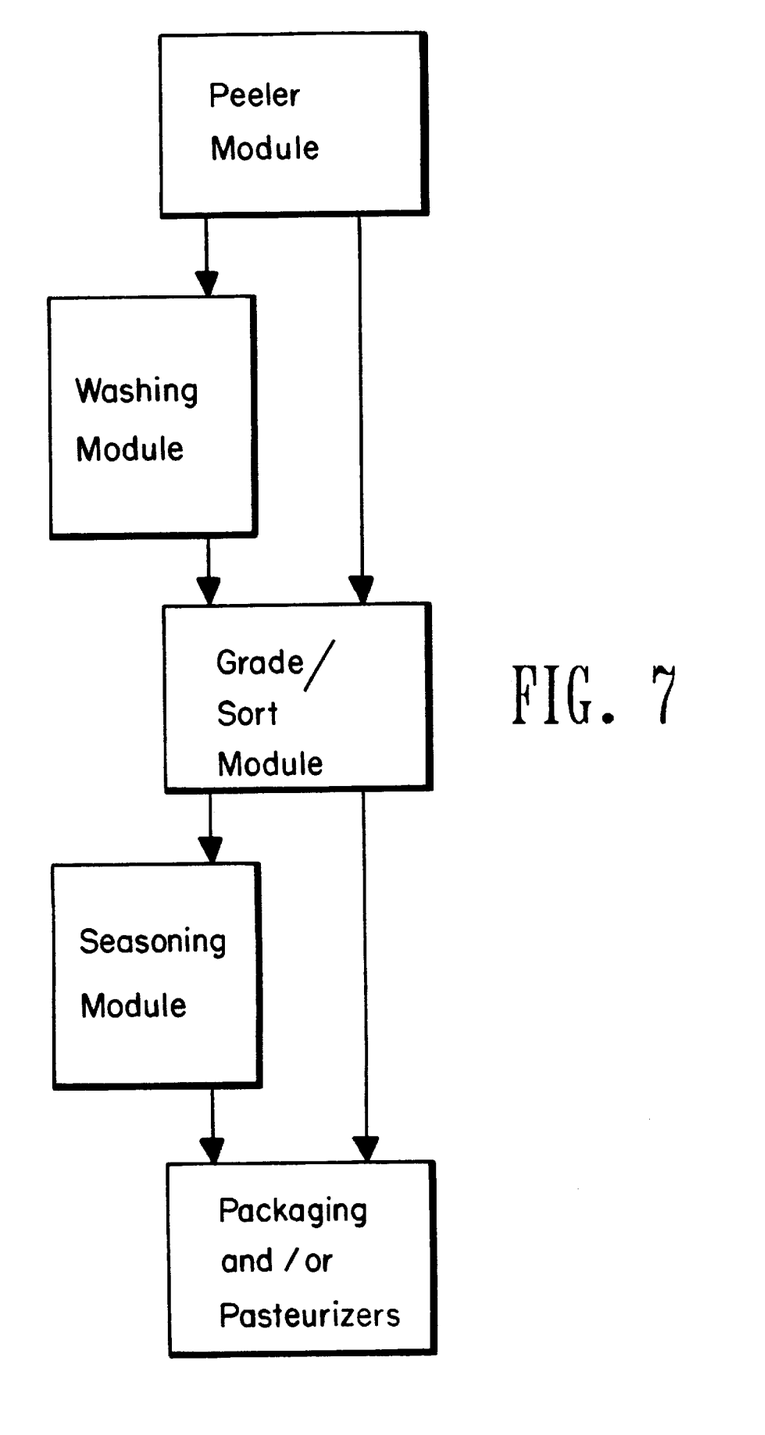
FIG. 7 Is a flowchart illustrating the use of the crawfish peeling apparatus of the present invention in combination with modules for washing, grading, seasoning and packaging the peeled and de-veined tail meat.

Referring now to FIG. 7 the inventors envision that the crawfish peeling apparatus of the present invention may be used as a single unit or in combinations of more than one. The multiple units being driven by commonly placed pneumatic and electrical switching devices. In addition, the units could utilize common bins for collecting the tail meat for further processing which may include washing, sorting, seasoning, packaging and/or pasteurizing the peeled and de-veined crawfish tails. The inventors believe that this modular design allows for easy expansion, repair and replacement of units as maintenance or production volume requires. The modular design also allows for easy transportation and assembly. In addition, the electrical and pneumatic controls could be located in an area separate from the food processing area.

The washing apparatus, for example, could consist generally of an inclined perforated cylinder with a device for spraying potable water onto crawfish tail meat that has been peeled and de-veined by the present invention. The peeled tail meat from the peeling module could be ejected or otherwise conveyed into the upper portion of the cylinder where it is tumbled through a water spray to remove the hepatopancreas and other destructive juices. An agitator, fixed to the wall of the cylinder would move the peeled and washed tail meat to the lower end of the cylinder. The lower end of the cylinder being made of several evenly spaced rods in progressively larger spacings to cause similar sized pieces of tail meat to fall out of the washer-sorter at preset locations. Alternately, the tail meat could proceed to the sorter end without washing as many traditional cooks desire the hepatopancreas or "fat" to remain with the meat. However, the inventors have found that washing the tail meat prior to packaging or pasteurizing increases the shelf-life of the meat significantly, an important factor to consider when shipping packaged tail meat to locations distant to the harvest area.

Optionally, the sorted or washed and sorted tail meat could then be routed to a seasoning vessel. The seasoning vessel consists of a rotating pressure vessel with a fixed agitator attached to the interior wall. The tail meat is placed in the vessel along with any desired spices or flavorings. The vessel is then sealed, evacuated and rotated. The spices or flavorings form an emulsion with the meat juices which are absorbed into the meat upon release of the vacuum. Traditionally crawfish are seasoned while being cooked and before being peeled which requires more pungent spices, that may not be appropriate for lighter dishes such as salads and pastas. The inventors believe that the advantage of seasoning tail meat in this fashion is that a broader range of flavors can be introduced directly into the meat, which allows the use of crawfish in more diverse types of dishes.

Finally, the seasoned or unseasoned tail meat, washed or with fat, processed by the present invention could then proceed to a packaging and weighing station where the tail meat can be placed into variously sized containers, pasturized, chilled, or frozen then forwarded for distribution and sale.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

We claim:

1. An apparatus for processing a crustacean shell having tail meat and an intestinal tract comprising:
   (a) a crustacean clamping device located above a clamping area;
   (b) a fluid nozzle in communication with a fluid source said fluid nozzle directing fluid onto and straightening the crustacean shell;
   (c) a hollow shell piercing tubular projection located in the clamping area and having an end suitable for piercing the shell; and
   (d) a fluid reservoir in fluid communication with the hollow shell piercing tubular projection;
      wherein the clamping device causes the hollow shell piercing tubular projection to puncture the shell of the crustacean and provide a blast of fluid from the fluid reservoir into the hollow shell piercing tubular projection to remove tail meat from the shell and intestinal track.

2. The apparatus of claim 1 wherein at least one clamping area is located on a reciprocating bed.

3. The apparatus of claim 1 wherein the fluid is air.

4. The apparatus of claim 1 wherein the shell piercing hollow tubular projection is positioned to allow for puncturing the shell, which has a tail and a fin, at approximately the second ring of the tail from the fin.

5. A method for processing a crustacean shell having tail meat and an intestinal tract comprising:
   (a) directing a fluid onto the crustacean shell to straighten the shell;
   (b) puncturing the crustacean shell with a hollow shell piercing tubular projection; and
   (c) providing a fluid through the hollow shell piercing tubular projection into the shell sufficient to eject the tail meat from the shell and intestinal tract.

6. The method of claim 5 where prior to step (a) the method includes:
   uncurling the shell of the crustacean prior to puncturing the crustacean shell.

7. The method of claim 6 wherein the shell of the crustacean is uncurled by high pressure air.

8. The method of claim 5 wherein the shell of the crustacean having a tail and a fin is punctured at approximately the second ring of the tail from the fin.

* * * * *